United States Patent Office 2,695,850
Patented Nov. 30, 1954

2,695,850

PLASTIC COMPOSITION

John Lorenz, New York, N. Y.

No Drawing. Application July 31, 1950,
Serial No. 176,917

7 Claims. (Cl. 106—76)

The present invention relates to plastic compositions, and more particularly to water-hardenable compositions which, on mixing with water, may be shaped to produce various kinds of products and finishes of superior ornamental character, such as tile or building blocks, wall boards, facings, ornamental objects, ornamental finishes on bases of various kinds, like stone, concrete and concrete blocks, cinder blocks, glass, wood and the like.

It is the general object of the present invention to provide a cheap, plastic material which can be utilized for the manufacture of objects and surfaces of various kinds characterized by beauty of finish, high strength and great permanence.

More specifically, it is an object of the invention to provide a plastic composition composed mainly of an hydraulic cement, preferably a white Medusa cement, whose setting is accelerated by certain additions to such a degree that molded objects can be manufactured therewith with a minimum of time spent in the molds, so that a high rate of production can be secured therewith and a relatively small amount of stock is tied up in the manufacturing plant.

It is also an object of the invention to provide an improved cement composition, which on the addition of the proper amount of water, yields an easily worked mass, which after mixing, can be poured into molds to yield objects of great strength and having hard dense surfaces which may be either dull in appearance or have a high lustre, or have any intermediate degree of light-reflecting character.

It is a particular object of the present invention to provide an inexpensive cement composition which on admixture of water, with or without certain substances to be described hereinbelow, yields an easily worked plastic mass to which various dyes and pigments can be added to yield dense and hard white or colored surfaces of great beauty.

A still further object of the invention is to provide a plastic composition which can be applied to various base surfaces, like brick, concrete, stone and the like, to provide a stucco or similar finish of hard and dense character, which is highly attractive in appearance and resistant to weather influences.

An additional object of the invention is to provide a cement composition having very strong adhesion to smooth surfaces, like glass, glazed ceramic ware and the like and providing on such smooth surfaces, a hard and strong coating which may be colored or painted on the surface or have coloring materials embodied therein, the finished surface being smooth or textured or patterned as may be desired.

Other objects and additions of the invention will appear as the following more detailed description of the invention proceeds.

I have found that certain additions of alkaline character to a white Medusa cement, converts such cement into a plastic material whose hardening time is reduced to such an extent that the cement can be economically employed for the manufacture of various molded objects and for providing hard, dense, weather resistant and decorative surfaces on various bases. The stone-like objects and surfaces thereby obtained are strong and highly resistant to disintegrating influences. To the cement there may be added, if desired, various filler materials like sand, asbestos, gravel, brick powder or chips and similar inert material to produce various types of mortar, stucco, concrete and concrete blocks and the like characterized by a high degree of strength and various degrees of smoothness and non-porosity of surface, depending upon the character of the fillers, the manner of application, and the smoothness of the mold interior in the case of molded articles.

As already indicated, the addition to the Medusa cement in accordance with the invention, are of alkaline character, no materials of acid reaction being employed in my process or composition. The alkaline additions include sodium silicates, including sodium metasilicate and water glass, and also alkali metal bases like sodium and potassium hydroxides, carbonates and bicarbonates. In addition to the above mentioned fillers, there can be used also various other more or less inert materials like limestone, dolomite, and precipitated chalk, the degree of smoothness of the finished surface depending in large part upon the fineness of the additions.

As the time of setting of the plastic material to a sufficiently hard and strong condition to enable the molded object to be removed from the mold is an important factor in carrying out my process, it is important that in a given process for the manufacture of a particular product, the proportions of the different ingredients be carefully controlled. Also, the time of stirring of the Medusa cement with the water and the alkaline addition or additions (and the filler, when used), must be controlled within relatively narrow limits, not only because excessive thickening of the cement composition prior to pouring or molding must be avoided, but also because the stirring time to some degree determines the moment at which the poured material reaches the sufficiently hard condition to permit removal of the molded object from the mold. In general, larger amounts of alkaline additions will advance the moment of setting of the cast or molded material to the hard condition. The setting time, as referred to in this specification, is measured from the moment that the Medusa cement has been brought into contact with the water, and includes the subsequent period of stirring and beating of the mixture.

In general, the period of mixing and the speed of the stirring mechanism should be so determined that thorough mixing occurs with uniform distribution of colloidal and other matter throughout the mass, so that a non-separating mixture is obtained. It is desirable that the mixture of water, cement and the various additions be allowed to reach a partially thickened condition before being poured into the mold so as to prevent seepage of liquid or colloidal matter from the upper portion to the lower portion of the poured material, or vice versa. It is desirable also that the mixing be continued until shortly before pouring, so as to keep the mass in more easily pourable condition through thixotropy. Where the period of stirring is of insufficient duration, the materials tend to separate into two layers or portions of different characteristics in the mold, and the danger arises that the top portion will harden quickly but produce a crumbling surface, while the lower portion hardens only very slowly.

In the examples hereinbelow, there are presented a large variety of proportions, additions and stirring periods, yielding moldable masses which vary greatly in their setting times. Thereby products of different surface finishes and of different structures, hardness, imperviousness, etc. are obtained, suited to the different purposes for which the compositions are to be employed. For best results with any particular composition, the operative should be familiar with the proper time of molding and setting of the composition. An important consideration is the use to which the composition is to be put, whether for manufacture of a concrete or stucco, for molding stones and tiles, or for ceramic casting. Observance of the proper proportions and stirring periods with the mixture of water, Medusa cement and, for example, sodium metasilicate, will improve the quality of the product and adapt the Medusa cement for purposes for which, in the absence of the sodium metasilicate, or other alkaline addition, it is unsuited. Proper observance of the factors mentioned will greatly reduce, if not entirely eliminate, porousness, cracking, "alligating" and chalking of the surface. At the same time, greater density and homogeneity are obtained even if the amount of water employed should be excessive. Other cements, like Portland gray cement, and retarded plaster of Paris and gauging plasters can be given improved qualities when properly combined with the reactive mixture of Medusa cement and, for example, sodium silicate. Also, finer quality of troweled surfaces and artistic embossings and texturing and patterning of porous surfaces can be obtained. In particular, there can be obtained with Medusa cement, fast-molded building materials, including building blocks and the like in the cold, that is, at room temperatures, which are superior in appearance and comparable in strength to kiln-fired or heat-hardened ceramic or other plastic material.

Various articles and surfaces of stone or ceramic-like character can thus be produced in accordance with the invention without the application of heat and solid or striated coloring can be imparted to the products by the addition of suitable non-reactive pigments or dyes. I have found casein colors, such as those manufactured by Ramon Shiva of 433 Goethe Street, Chicago, Illinois, and known as Shiva casein colors, to give the most brilliant hues, especially for stucco or embossing (overlay) work. The alkaline additions cut the setting time by fifty per cent or more in the case of small batches, and by at least fifty per cent, or only slightly less, in the case of larger batches. Higher proportions of alkaline additions tend to produce brittleness, but this is at least in part overcome by the use of fillers like sand and gravel. Suitable proportions are one part of cement to 1½ parts of fillers, the fillers generally acting to increase the strength of the product and generally also in producing higher glazes on the top and bottom surfaces of a molded article. Hardness and strength of the products increase with aging, especially if they are allowed to harden under a moist covering for about twenty-four hours. It is sometimes of advantage to preheat the Medusa cement as this helps to disintegrate the lumps developed after long storage. It is desirable that all of the components of the mixture be of uniform fine grain.

The invention will be further described by way of the following examples which are presented for purposes of illustration only:

*Example 1*

To one fluid ounce of water at 76° F., there are added 15.4 grains (1 gram) of sodium metasilicate crystals and the latter allowed to disintegrate and dissolve, which usually requires about 10 minutes. To this mixture there are then added 3 oz. of a non-staining Medusa white Portland cement, the mixing being effected in one step. The mixture is then stirred and beaten rapidly until it is homogeneous. Thereafter, it is stirred frequently over a total period of about 43 minutes (measured from the moment of adding the Medusa cement). The plastic mass is now ready for molding. After pouring into molds, it becomes hard in about one hour and 5 minutes, at which time it can be removed from the mold. A strong, hard, dense, white product is obtained.

When the initial temperature of the water is 56° F., but the proportions and conditions are otherwise the same as described above, the total stirring period being likewise the same, setting to the hard condition in the mold will require about one hour and 30 minutes. In both cases, heat is liberated during the setting in the mold.

*Example 2*

To one fluid ounce of water at 76° F., there are added 7.7 grains of sodium metasilicate crystals, which are allowed to dissolve. To this mixture, there are added 2¾ oz. of Medusa white cement with which there has previously been mixed, 15.4 grains of sodium metasilicate crystals, the mixing taking place all at once. The mixture is then stirred and beaten rapidly at short intervals for a period of about 27 minutes, at the end of which period, a uniform mixture is obtained which is ready for molding. During the setting in the mold, an exothermic reaction sets in and the article sets to the hard and firm condition in about 50 minutes from the time that the Medusa cement was incorporated in the water solution of sodium metasilicate. The more rapid setting of the product is due to the larger proportion of sodium metasilicate.

*Example 3*

To 4/15 fluid oz. (8 cc.) of water at 76° F., there are added 10 grains of sodium metasilicate crystals, the mixture stirred well for about 10 minutes, after which one oz. of Medusa white cement is added thereto at once and the mixing continued for about 5 minutes, whereupon a thick and moist paste is produced.

To this paste are then added ⅗ fluid oz. (18 cc.) of water at 76° F., whereupon mixing is resumed for 4 minutes. To the resulting watery mixture, there are added 2 oz. of Medusa white cement, and the mixture is stirred well for a period of 10 minutes. After pouring into the molds, it sets in 47 minutes (measured from the end of the first mixing), after giving off heat in the mold. The product is especially suited for making tiles and similar stone-like products.

*Example 4*

To 0.9 fluid ounce (27 cc.) of water at 76° F., there is added 7.7 grains of sodium metasilicate crystals and the mixture stirred for about 10 minutes. To the solution so obtained, there are added 3 oz. of Medusa white cement and the mixture stirred for about a period of 50 minutes. After pouring into molds, the paste sets hard in one hour and 26 minutes from the addition of the Medusa cement. If 3 oz. of moist sand or gravel are added to the mixture, the stirring should preferably continue for 43 minutes and in such event, the poured mass will reach the hard condition, enabling it to be removed from the mold, in 46 minutes. In general, it has been my experience that the addition of fillers reduces the time for hardening.

*Example 5*

3 oz. of Medusa cement which have previously been mixed with 15.4 grains of powdered sodium metasilicate crystals, are mixed with 0.9 fluid oz. (27 cc.) of water having a temperature of 76° F. The mixture is then stirred and beaten rapidly until a consistency of paste is the result. The paste is thereafter stirred periodically to produce a uniform mixture until a period of 53 minutes or longer has elapsed. In general, the longer period of mixing, the better will be the setting qualities, whereas with a lower period of mixing, the setting will be slower, and the product will be of poorer quality. Thus, I have found that if the mixing is not thorough and the thickening is not advanced sufficiently, during the stirring, as when the total stirring period is only 40 minutes or less, the poured mass, when exposed to the atmosphere without being covered with a moist cloth or the like, will set very rapidly at the surface, forming a hard crust, but the interior will remain in a still soft condition, so that if it is attempted to remove the article from the mold, the top crust will crumble.

After stirring for the period of time necessary to produce a uniform paste which is thick enough and in which the reactions have advanced far enough to insure against seepage of liquid or colloidal material from the top toward the bottom of the poured mass, the paste is poured into molds. It is carefully allowed to set while covered with a moist cloth. The exothermic reaction continued in the mold and the molded article sets hard in about one hour and 40 minutes. If only 0.75 oz. of water is used, the plastic mass will set in about one hour and 25 minutes. The addition of dry fillers will cause faster setting; while if they are moist, the rate of setting will be only negligibly slower.

For best results in the manufacture of a stone-like article, the fillers are added in about 53 minutes after the addition of the cement to the water; i. e., immediately before the pouring, followed by rapid mixing to distribute the filler uniformly.

To adapt the plastic composition for producing embossing effects or overlays, casein glue or liquid cements can be added to the mixture after 10 to 20 minutes of mixing of the Medusa cement with the water. Where casein is added, it is not necessary to wait 53 minutes before the mass is poured. About 7.7 to 15.4 grains of casein can be used in the above mixture, depending upon the purpose for which the product is to be used or type of surface desired. The porous surfaces will require less casein than non-porous surfaces, the exact proportion depending also on the degree of adhesion required between the plastic preparation and the object to which it is to adhere; thus glass surfaces which are to be embossed or coated with the cement composition will require a higher proportion of adhesive in the cement than rough surfaces, like those of stone, concrete and the like.

In place of the casein glue, other glues like fish glue and other animal glues can be used but in general, various other water compatible glues and adhesives like urea and other water reactive resin glues can be employed in my composition.

*Example 6*

4 grains of sodium metasilicate crystals are added to 0.9 fluid oz. of water at 76° F. and allowed to disintegrate therein for about 10 minutes. The mixture is then stirred well and there are added thereto, 3 oz. of Medusa cement, which have been previously mixed with 2 grains of powdered sodium bicarbonate crystals. The mixture is periodically stirred well for a period of 50 minutes, after which time the molding must be done very rapidly. After being poured into a mold, the mass gives off heat and sets hard in about a minute after the pouring (51 minutes after all of the components have been brought together).

*Example 7*

4 grains of sodium metasilicate crystals are allowed to disintegrate for a period of 10 minutes in 14/15 fluid ounces (28 cc.) of water at 76° F. To this mixture there are then added 3 oz. of Medusa cement and the mass stirred well for a period of about 10 minutes. There are then added thereto 15.4 grains of precipitated chalk (or any other finely ground calcium carbonate material). The mixture is periodically well stirred until a period of 30 minutes has elapsed from the moment that the Medusa cement was added to the aqueous mixture. The plastic mass is now ready for pouring. It liberates heat in the mold and sets had in 47 minutes (from the moment of adding the Medusa cement). Without the addition of the calcium carbonate, the plastic mixture would set hard in about 3½ hours.

*Example 8*

In this embodiment of the invention there is employed Medusa cement which has been pre-heated to about 400° F., and then allowed to cool to room temperature.

15.4 grains of sodium metasilicate crystals were allowed to disintegrate in one fluid oz. of water at 76° F. for about 10 minutes. To this solution there were then added 3 oz. of pre-heated, non-staining Medusa Portland white cement, all of the cement being added at once. The mixture is stirred and beaten rapidly until it is of uniform texture and thereafter it is frequently stirred until a period of 43 minutes has elapsed from the moment of mixing in the Medusa cement. On molding, the mixture gives off heat and sets hard in one hour.

*Example 9*

15.4 grains of sodium metasilicate crystals are allowed to disintegrate in one fluid oz. of water at 76° F. for about 10 minutes, and there are then added, all at once, 3 oz. of non-staining Medusa Portland white cement which have previously been mixed with 15.4 grains of sodium metasilicate crystals. The mixture is stirred rapidly for a period of about 20 minutes and is then poured into a mold. Heat was given off in the mold and the paste set hard in 1 hour and could then be removed from the mold.

If the mixture is stirred for 25 minutes instead of 20 minutes, the time required for the mix to set hard is reduced to about 45 minutes. On the other hand, if the amount of water employed is increased to 1⅙ fluid oz. (35 cc.) and the stirring period increased to 1 hour 14 minutes, the mixture sets hard in 1 hour 25 minutes, but is chalky in character and therefore unsatisfactory.

*Example 10*

To 1 fluid oz. (30 cc.) of water at 76° F., there are added 7.7 grains of sodium metasilicate crystals which are allowed to disintegrate and dissolve therein for about 10 minutes. To this mixture there are then added, all at once, a mixture of 3 oz. of Medusa cement and 15.4 grains of sodium metasilicate crystals. The mass is rapidly stirred for a few minutes, or until a homogeneous mixture is obtained, and is then stirred frequently until a period of 32 minutes has elapsed from the addition of the cement. The mix gives off heat on setting in the mold and sets hard in 1 hour.

This experiment was repeated with the sole difference that the starting temperature of the water was 54° F. The setting time remained substantially the same. However, when the quantity of water was reduced to 0.9 fluid ounce and the stirring period to 25 minutes, the conditions being otherwise substantially the same (initial water temperature 76° F.), the setting time was reduced to 46 minutes.

*Example 11*

To 14/15 fluid oz. (28 cc.) of water at 84° F., were added 3 oz. of Medusa cement with which has been mixed 10 grains of sodium metasilicate crystals and 5 grains of sodium hydroxide (which assayed 96% sodium hydroxide, ½% sodium carbonate and 3½% inert matter). The mixture was stirred and beaten rapidly for 25 minutes and was then poured. Heat was given off during the setting of the mixture, and it set hard in 40 minutes.

*Example 12*

A mixture of 3 oz. of Medusa white cement and of 15.4 grains of sodium metasilicate crystals are poured, all at once, into 0.9 fluid oz. (27 cc.) of water at 84° F. The mixture is stirred and beaten rapidly for a few minutes and then stirred frequently until a period of 43 minutes has elapsed from the mixing with the water. After pouring into a mold, the mixture gave off heat and set hard in 1 hour. Comparison with Example 5 shows that an increased initial water temperature but decreased period of stirring prior to pouring tended to counterbalance each other; but if the stirring time was reduced to 43 minutes prior to molding and at the same time the water temperature was reduced considerably, as to 54° F., the conditions being otherwise the same as just described, the product is unsatisfactory. It sets hard on the surface without giving off any heat which can be detected, by the hand, and when the hard crust is broken open about 1 hour 46 minutes from the moment that the cement was added to the water, it is found that the interior is soft and wet. This condition can be remedied if the mixture is not poured until at least 1 hour has elapsed from the mixing of the cement with the water.

*Example 13*

15.4 grains of sodium metasilicate crystals are allowed to dissolve in 1 fluid oz. (30 cc.) of water at 76° F. for about 10 minutes. A mixture of 3 oz. of Medusa cement and ½ oz. of Portland gray cement is added, in one step, to the water and the mixture stirred and beaten rapidly for about 5 minutes, after which it is stirred frequently until 47 minutes have elapsed from the addition of the cement to the water, to produce a homogeneous mixture. On pouring into a mold, the mass gives off heat and sets hard in about 1 hour.

*Example 14*

To 2 fluid oz. (60 cc.) water at 77° F. are added 15.4 grains of sodium metasilicate crystals, after which there is poured in, in one step, a mixture of 5 oz. of Medusa white cement and 15.4 grains of sodium metasilicate crystals. After stirring and beating the mixture rapidly for a few minutes, there are added 5 oz. of fine gravel or sand in a moist state (all excess water having been removed). The mass is mixed well for a few minutes and thereafter is frequently stirred until about 1 hour 2 minutes has elapsed from the moment of adding the cement to the water. The mixture is then poured into mold and sets hard in about 1 hour 30 minutes.

*Example 15*

15.4 grains of sodium metasilicate crystals are added to 1⅔ fluid oz. (50 cc.) of water at 82° F. and allowed to dissolve therein over a period of about 10 minutes. To these are added 5 oz. of Medusa white cement which have previously been mixed with 15.4 grains of sodium metasilicate crystals. After stirring the mixture for a short time, or until a uniform mixture is obtained, there are added 7½ oz. of sand which were moistened after weighing, but from which all excess water was removed after the washing. The mass is mixed well for about 43 minutes (again measured from the moment of addition of cement to the water) and it is then ready for molding. Heat is given off in the mold and the mixture sets hard in about 50 minutes.

Example 16

To 1⅓ fluid oz. (40 cc.) of water at 83° F. are added 15.4 grains of sodium metasilicate crystals which are allowed to dissolve therein for about 10 minutes. To this mixture are then added 3 oz. of Medusa white cement and the mass mixed for about 5 minutes, after which 4 oz. of dry sand are stirred in and the mixing continued vigorously until the mass is homogeneous. Stirring is repeated frequently until 43 minutes have elapsed from the moment of addition of the cement. The mixture is then poured into a mold, in which it gives off heat and sets hard in about 55 minutes.

Example 17

To 0.8 fluid oz. (24 cc.) of water at 84° F. are added 53 grains of liquid sodium silicate (water glass) and well mixed therein, after which 3 oz. of Medusa white cement, previously mixed with 15.4 grains of sodium metasilicate crystals are poured in at once. A dense paste of heavy consistency results. This is vigorously stirred and worked up into a soft plastic paste in a few minutes' time. There are then added from 3 to 6 oz. of fine moist sand or gravel from which excess water has been removed for fast setting. The mixture is stirred well for 20 minutes and is then ready for pouring. No appreciable heat is given off in the mold and the mixture sets hard in about 50 minutes. To produce a surface glaze, the paste is tamped into the mold and vibrated for a time to cause coarse particles to settle below the surface.

Example 18

53 grains (about 2.4 cc.) of liquid sodium silicate (soluble water glass) are mixed well with 0.8 fluid oz. (24 cc.) of water at 84° F. To this mixture are then added, in one step, a mixture of 3 oz. of Medusa white cement and 15.4 grains of sodium metasilicate crystals. The mass is well stirred for a few minutes, or until a uniform plastic paste is obtained, and it is then stirred occasionally until a period of 32 minutes from the mixing in of the cement has elapsed. The period of mixing should be carefully watched since too much agitation induces too rapid setting. On pouring, the mixture gave off only a small amount of heat and set hard in 40 minutes. The product has a high glaze and is a very good cast stone.

Example 19

21 grains of liquid sodium silicate (soluble water glass) are mixed well with 0.7 fluid oz. (21 cc.) of water at 76° F. Into this solution there is stirred in a mixture of 2½ oz. of Medusa white cement and 7.7 grains of sodium metasilicate crystals. The mixture is stirred thoroughly into a smooth plastic of medium consistency and then mixed periodically until about 48 minutes have elapsed. The mixture is now ready for molding and can be allowed to set either under a moist covering or exposed directly to the atmosphere. The mixture gives off heat in the mold and sets in about 1 hour 37 minutes.

Example 20

One fluid ounce of water is mixed with three ounces of Medusa cement and 7.7 grains of casein glue ("Casco" brand, manufactured by Borden) until uniform and there are then slowly added five or six drops of water glass or a solution containing sixty grains, or somewhat more, of sodium metasilicate per ounce of water. Mixing is continued until the mass will no longer flow when applied to a vertical surface. After allowing it to stand for about one-half hour, followed by vigorous stirring, it can be applied as stucco or as a decorative surface to various bases on which it will set and harden in a much shorter time than would a Medusa cement and water mixture alone.

Example 21

Where larger volumes or weights of a mixture in accordance with the invention are molded in one piece, the setting time will be longer, but in any event will be much less than in the absence of the alkaline additions. Thus a mixture of two pounds of water, six pounds of Medusa cement and 1.5 oz. of sodium metasilicate, the temperature of the water being 82° F. and that of the atmosphere 78° yields a mass which can be removed from the mold in three hours; whereas the same mixture would require six to eight hours or more for setting to the rigid condition in which it could be handled, in the absence of the sodium metasilicate. The self-hardening mass can be prepared by first mixing 1¾ pounds of the water with all of the sodium metasilicate followed by mixing in all of the Medusa cement, resulting in the production of a heavy paste. The remainder of the water (¼ pound) is then added and on stirring the mixture becomes more easily flowing. After stirring the mixture for about fifteen minutes, it is poured into a mold which is two inches deep. Heat is liberated during the hardening and the mass sets in two hours and forty minutes and, as already indicated, can be safely removed from the mold in three hours.

Example 22

At somewhat higher temperatures, for example, 86° F. or higher, a mixture of Medusa cement and sodium metasilicate (or a mixture of sodium metasilicate and water glass) a very rapid setting of the plastic composition is obtained, much faster than at lower temperatures. Also, a much smaller amount of sodium metasilicate needs be mixed with the Medusa cement to produce the rapidly setting composition.

To two fl. ozs. (60 cc.) of water at 86° F. there were poured in one step 6 ozs. of Medusa cement mixed with 7.7 grains of sodium metasilicate crystals. The mixture is stirred for only about five to seven minutes, after which period it is still quite fluid, and is poured into a mold. It thickens very rapidly and becomes firm in 15 to 20 minutes and sets in 25 minutes. It gives off sensible heat for a period of nearly an hour.

Example 23

21 ozs. of Medusa cement mixed with 35 grains of sodium metasilicate crystals, this mixture being at a temperature of 86° F., is added at once to 7 fl. oz. of water which is likewise at 86° F. The mixture is stirred for 5 minutes, thickening very rapidly, and is then poured into a deep cylindrical mold in which it sets firm in about 25 minutes. The hardening mass gave off sensible heat for nearly one and one-half hours.

At a temperature of 86° F. or somewhat higher the Medusa cement mixtures described in Examples 22 and 23 compare favorably, as regards speed of setting, with plaster of Paris. Medusa cement-sodium metasilicate mixtures can thus be used in combination with plaster of Paris, and at the higher temperatures will be rapidly setting quite independently of any influence that may be exerted by the plaster of Paris. The Medusa cement, sodium metasilicate and plaster of Paris mixtures provide a rapidly setting composition which is useful in the manufacture of inexpensive cast art objects and also of building materials wherein strength is not of paramount importance, as in plaster board and the like.

The proportions of Medusa cement and plaster of Paris to be employed will depend upon the specifications of the finished product, a typical example being equal parts of Medusa cement and plaster of Paris or one part of the one to 2 or 3 parts of the other, the quantity of sodium metasilicate being made dependent upon the amount of Medusa cement employed, and in the proportions above indicated.

As already indicated, the above examples are illustrative only, and the proportions, absolute quantities and stirring periods can be varied under different conditions for producing optimum results, as can be determined by simple experimentation for a given set of conditions. Thus, to make a preparation which will adhere strongly to thermoplastic materials, or to other surfaces which are soluble or swell in organic solvents, or to objects made of insoluble materials which have been given a plastic surface which is soluble in an organic solvent, or can be converted into a swelled adhesive surface, such as a paint or lacquer film (as of cellulose acetate or nitrate, vinyl plastics, styrene plastics, etc.) there can be added to the mixture of e. g. Example 20, a quantity of organic solvent which will dissolve the surface film or cause it to swell, such as alcohol-acetone mixtures, lacquer thinners containing amyl acetate or other ester or ketone solvents, benzene, acetone-benzene mixtures (1:1), aniline, naphtha, etc. in the amount of about 5.0 cc. or more for each 3 oz. of Medusa cement. This causes softening of the plastic surface and on drying, the set stone is firmly bonded to the base. Styrene plastics are superior in use for the cement coatings, having better adhesion thereto. This composition can be made highly fluid and used for embossing with a brush or poured in thin streams on to the base to make any desired pattern thereon. Various pigments can be added to the composition to obtain any selected color effects. A clear lacquer coating can be applied to the embossed base to give a lustrous finish.

To get a very hard stone from the mixture of Example 20, or modified as just described, and also from the mixtures of the other examples, water should be applied after the setting of the stone to obtain a complete water cure. Thus, with objects embossed with the water-hardenable mixtures above described, the water can be applied in the form of a fine spray to effect cure. The embossed plastic article can also be dipped in a solvent for the plastic so as to increase the adhesion of the cement composition to the surface and at the same time generally reduces the glaze where this is desired.

I claim:

1. Process for the manufacture of artificial stone, stucco, and the like, comprising mixing a quantity of white Portland cement containing for each 3 ounces of the cement about 15 to 45 grains of an addition consisting of sodium metasilicate with an amount of water sufficient to form a paste, stirring the paste until a non-separating mass is obtained, casting the mass in a mold while in the alkaline condition, and allowing the same to harden.

2. A cement composition of alkaline reaction comprising white Portland cement mixed with an addition of sodium metasilicate in the proportion of 3 ounces of the former to about 15 to 45 grains of the latter, and adapted, on mixing with water, to form a plastic mass which hardens to a hard, strong, stone-like mass within about an hour.

3. A molded stone-like product comprising a water-hardened white Portland cement containing about 15 to 45 grains of an alkaline addition component to 3 ounces of cement, said component consisting essentially of sodium metasilicate, the product being in non-neutralized condition.

4. A molded stone-like product comprising a water-hardened white Portland cement containing an addition consisting of about 15 to 45 grains of sodium metasilicate and sodium carbonate to 3 ounces of the cement, the product being in non-neutralized condition.

5. A molded stone-like product comprising a water-hardened white Portland cement containing an addition consisting of about 15 to 45 grains of sodium metasilicate and sodium hydroxide to 3 ounces of the cement, the product being in non-neutralized condition.

6. A molded stone-like product comprising a water-hardened white Portland cement containing an addition consisting of about 15 to 45 grains of sodium metasilicate and sodium bicarbonate to 3 ounces of the cement, the product being in non-neutralized condition.

7. A molded stone-like product comprising a water-hardened white Portland cement containing an addition consisting of about 15 to 45 grains of sodium metasilicate mixed with a member of the group consisting of sodium hydroxide, sodium carbonate, and sodium bicarbonate, to 3 ounces of the cement, the product being in non-neutralized condition.

References Cited in the file of this patent

UNITED STATES PATENTS

| Number | Name | Date |
|---|---|---|
| 1,468,029 | Noll | Sept. 18, 1923 |
| 1,861,317 | Moross | May 31, 1932 |
| 1,970,921 | Schneider | Aug. 21, 1934 |
| 2,187,668 | Smith | Jan. 16, 1940 |
| 2,215,812 | Kaplan | Sept. 24, 1940 |
| 2,522,707 | Faber et al. | Sept. 19, 1950 |

FOREIGN PATENTS

| Number | Country | Date |
|---|---|---|
| 65,966 | Denmark | Dec. 1, 1947 |
| 614,377 | Great Britain | Dec. 14, 1948 |
| 620,500 | Great Britain | of 1949 |